United States Patent [19]

Suzuki

[11] Patent Number: 5,613,167
[45] Date of Patent: Mar. 18, 1997

[54] ACTIVE-TYPE AUTOMATIC FOCUSING APPARATUS

[75] Inventor: Ryouichi Suzuki, Yokohama, Japan

[73] Assignee: Canon Kabushiki Kaisha, Tokyo, Japan

[21] Appl. No.: 325,820

[22] Filed: Oct. 19, 1994

[30] Foreign Application Priority Data

Oct. 25, 1993  [JP]  Japan ................................ 5-287280

[51] Int. Cl.⁶ ............................. G03B 13/36; G01C 3/08
[52] U.S. Cl. ...................................... 396/106; 356/3.08
[58] Field of Search ............................. 354/403; 356/3.08

[56] References Cited

U.S. PATENT DOCUMENTS

| | | | |
|---|---|---|---|
| 4,257,705 | 3/1981 | Hasoe et al. | 354/403 X |
| 4,443,078 | 4/1984 | Niwa et al. | 354/403 |
| 4,518,242 | 5/1985 | Toyama | 354/403 |
| 4,814,810 | 3/1989 | Ishiguro | 354/403 |
| 5,210,585 | 5/1993 | Suzuki | 354/403 X |
| 5,221,955 | 6/1993 | Inoue | 354/403 X |
| 5,235,377 | 8/1993 | Ide et al. | 354/403 |
| 5,361,117 | 11/1994 | Nonaka | 354/403 |
| 5,373,344 | 12/1994 | Kakiuchi | 354/403 |

FOREIGN PATENT DOCUMENTS

| | | | |
|---|---|---|---|
| 0453946 | 10/1991 | European Pat. Off. | G02B 7/32 |
| 0525747 | 2/1993 | European Pat. Off. | G03B 13/20 |
| 3433697 | 4/1985 | Germany | G02B 7/11 |

*Primary Examiner*—W. B. Perkey
*Attorney, Agent, or Firm*—Fitzpatrick, Cella, Harper & Scinto

[57] ABSTRACT

An active-type automatic focusing apparatus having an arrangement that a light receiving portion is disposed on each side of a light emitting unit to obtain the distance from a subject in accordance with the output from each light receiving portion. An automatic focusing apparatus of the foregoing type is enabled to have a small size by shortening the distance from either of the light receiving portions disposed on the two sides of the light emitting unit to the light emitting unit than the distance from the other light receiving portion.

9 Claims, 4 Drawing Sheets

ACTIVE-TYPE AUTOMATIC FOCUSING APPARATUS

BACKGROUND OF THE INVENTION

1. Field of the Invention

The present invention relates to an active-type automatic focusing apparatus that irradiates, with light, a subject, the range from which is intended to be found, that is, a subject of range finding, and receives light reflected from the subject to calculate information of the found range.

2. Related Background Art

Hitherto, a so-called active-type automatic focusing apparatus has been known which emits light from a light emitting device, such as an IRED, to a subject and which receives light reflected from the subject by a semiconductor position sensing device (PSD) or the like to measure the distance from the position, at which light has been received, to the subject by a principle of triangulation.

Referring to FIG. 5, an active-type automatic focusing apparatus of the foregoing conventional type will now be described.

Referring to FIG. 5(a), reference numeral 10 represents a light emission side lens, 11 represents a light receiving side lens, 12 represents an IRED (Infrared Ray Emitting Diode), 13 represents a semiconductor position sensing device (a PSD), and 14 represents a subject.

Light emitted from the IRED 12 is allowed to pass through the light emission side lens 10 and the subject 14 is irradiated with light. Light reflected by the subject 14 is allowed to pass through the light receiving side lens 11 before it is made incident upon the PSD 13. The position at which light is made incident upon the PSD 13 is shifted depending on the change in the distance from the subject 14, thus causing electric currents $I_A$ and $I_B$ transmitted from pair of the two ends of the PSD 13 to be changed.

Thus, an apparatus of the foregoing type is arranged in such a manner that the electric currents $I_A$ and $I_B$ are electrically amplified to calculate the distance to the subject.

A problem of the contrast of the subject will now be described.

If the subject 14 has no contrast, the center of a spot 15 of light reflected by the subject 14 is brought to a central position of the spot 15, a distance $x_1$ from an end of the PSD 13, as shown in FIG. 5(b). Thus, the level of each of the output electric currents $I_A$ and $I_B$ at the two ends of the PSD 13 corresponds to the position $x_1$.

Assuming that the contrast, and thus the reflectance of the right half portion of the subject 14 is low, the light spot 15 on the PSD 13 has a contrast as shown, for example, in FIG. 5(c). That is, the position of the center of the light spot 15 on the PSD 13 is shifted to right by a distance a. As a result, the position of the center of light is made to be $(x_1+a)$, thus causing distance information corresponding to the shift to be displaced in the direction in which the distance is shortened.

As described above, the conventional active-type automatic focusing apparatus has a basic problem that the apparatus erroneously measures the distance from a subject if the subject has a contrast. The foregoing problem also arises in a case where the irradiation beam is applied to only a part of the subject.

An arrangement that is capable of overcoming the foregoing problem has been disclosed in U.S. Pat. No. 4,814,810. FIG. 6(a) illustrates the basic structure of the disclosure of the '810 patent in such a manner that the same elements as those shown in FIG. 5 are given the same reference numerals.

The active-type automatic focusing apparatus according to the '810 patent comprises a light receiving side lens 16 at a symmetrical position with respect to the light emission side lens 10 in a direction of the base line of the light receiving side lens 11. The active-type automatic focusing apparatus further includes a PSD 17 at the position of the focal point of the light receiving side lens 16. Reference numeral 12 represents an IRED.

If the subject 14 has, for example, a contrast as shown in FIG. 6, light emitted from the IRED 12 is reflected by the subject 14. As a result, spot images are formed on the PSDs 13 and 17. A state of the spots is shown in FIG. 6(b).

Since the light receiving side lenses 11 and 16 are positioned symmetrically with respect to the light emission side lens 10, adequate adjustment of the positions of the PSD 13 and the PSD 17 enables the spot positions $x_1$ and $x_2$ to be symmetrical and to have the same values.

If the subject 14 has the contrast as shown in FIG. 6(a), the state of spot images on the PSDs 13 and 17 is as shown in FIG. 6(b). Assuming that the difference in the position of the center of light taking place depending upon the contrast of a subject 14 is a, the position of the center of light is, on the PSD 13, $(x_1+a)$ and that on the PSD 17 is $(x_2-a)$ because the center of light moves in the same direction on the PSDs 13 and 17.

Thus, output $F_1$ from a distal terminal of the PSD 13 (an end of the PSD 13, the output from which is made to be larger than another terminal when a subject is positioned away from the apparatus) and output $F_2$ from a distal terminal of the PSD 17 are enabled to be added to each other by connecting the foregoing terminals. Output $N_1$ from a proximate terminal of the PSD 17 (a terminal of the PSD 17, the output from which is made to be larger than another terminal when a subject is positioned at a near position) and output $N_2$ from a proximate terminal of the PSD 17 are enabled to be added to each other by connecting the foregoing terminals. Then, electric currents $I_F$ and $I_N$ denoting the results of the additions and expressed as follows are taken:

$$I_F \propto (1-x_1-a)+(1-x_2+a)$$
$$\propto (2-x_1-x_2)$$
$$I_N \propto (x_1+a+x_2-a)$$
$$\propto (x_1+x_2)$$

Thus, the output electric currents $I_A$ ($I_N$) and $I_B$ ($I_F$) are not dependent on the spot center movement, a, caused by the contrast of the subject.

As described above, because the two PSDs 13 and 17 are positioned away from each other by the length of the base line and disposed symmetrically with respect to the light emission side lens 10, and because the output sum from each of the PSDs 13 and 17 is obtained the influence of the subject contrast is basically eliminated. However, the apparatus disclosed as described above involves a necessity of further disposing the light receiving side lens and the light receiving device with respect to a center of symmetry in the direction of the base line as compared with the conventional active-type automatic focusing apparatus. Therefore, there arises a problem in that the size of the apparatus cannot be reduced.

SUMMARY OF THE INVENTION

Accordingly, an object of the present invention is to provide a distance or focus detection apparatus that can be adapted to an active-type automatic focusing apparatus capable of reducing the size of the apparatus and eliminating an influence of the contrast.

According to one aspect of the present invention, an apparatus for determining at least one of a range to an object and a focus state of the object comprises a light emitting member for emitting light, the light being reflected by the object. First and second light receiving optical systems, each positioned to receive light emitted from the light emitting member and reflected by the object, are provided, the diameter of either of the first or second light receiving optical systems being smaller than the diameter of the other of the first and second light receiving optical systems. First and second light receiving members are further provided, each positioned to receive light from the first and second light receiving optical systems, respectively. At least one of the range to the object and a focus state of the object is determined in accordance with an output representing light received by the first and second light receiving members.

According to another aspect of the present invention, an apparatus for determining at least one of a range to an object and a focus state of the object comprises a light emitting member for emitting light through a light emitting optical system, the light being reflected by the object. First and second light receiving optical systems, each positioned to receive light emitted from the light emitting member and reflected by the object, are provided, the first light receiving optical system being disposed adjacent to the light emitting optical system and the distance from the first light receiving optical system to the light emitting member being shorter than the distance from the second light receiving optical system to the light emitting member. First and second light receiving members are also provided, each positioned to receive light from the first and second light receiving optical systems, respectively. At least one of the range to the object and a focus state of the object is determined in accordance with an output representing light received by the first and second light receiving members.

According to a still further aspect of the present invention, an apparatus for determining at least one of a range to an object and a focus state of the object comprises a light emitting member for emitting light through a light emitting optical system, the light being reflected by the object. First and second light receiving members, each positioned to receive light emitted from the light emitting member and reflected by the object, are provided, wherein a length of either of the first and second light receiving members is shorter than a length of the other of the first and second light receiving members. At least one of the range to the object and a focus state of the object is determined in accordance with an output representing light received by the first and second light receiving members.

According to yet another aspect of the present invention, an apparatus for determining at least one of a range to an object and a focus state of the object comprises a light emitting member for emitting light through a light emitting optical system, the light being reflected by the object. First and second light receiving members, each positioned to receive light emitted from the light emitting member and reflected by the object, are provided, wherein a length of either of the first and second light receiving members is different from a length of the other of the first and second light receiving members. A calculating circuit obtains at least one of the distance from the subject and the focus state in accordance with an output from the first light receiving member and an output from the second light receiving member, a ratio of the output and the length of the first light receiving member being substantially the same as a ratio of the output and the length of the second light receiving member.

Other and further objects, features and advantages of the invention will be appear mode fully from the following description.

DESCRIPTION OF THE PREFERRED EMBODIMENTS

First Embodiment

Preferred embodiments of the present invention will now be described with reference to the drawings.

Figure 1:
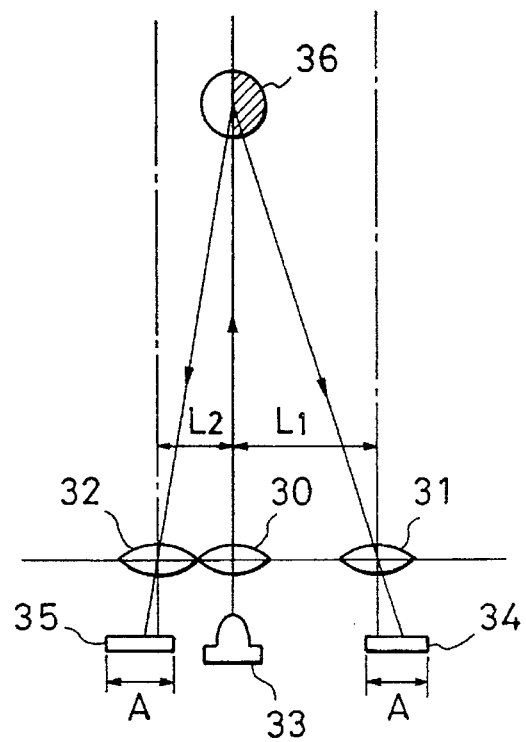
FIG. 1 is a block diagram which illustrates an essential portion of an optical system of an active-type automatic focusing apparatus according to a first embodiment of the present invention.

FIG. 1 is a block diagram which illustrates an essential portion of an optical system of an active-type automatic focusing apparatus according to a first embodiment of the present invention. In this embodiment, the foregoing apparatus is adapted to a camera.

Referring to FIG. 1, reference numeral 30 represents a light emission side lens. Reference numerals 31 and 32 represent light receiving side lenses. The light receiving side lenses 31 and 32 respectively are disposed asymmetrically with respect to the light emission side lens 30 at the center in such a manner that the distances from the light receiving side lens 31 to the light emission side lens 30 and that from the light receiving side lens 32 to the lens 30 are different from each other. Reference numerals 34 and 35 represent PSDs serving as light receiving devices disposed to receive light beams received by the corresponding light receiving side lenses 31 and 32.

The light receiving side lens 32 and the PSD 35 are disposed nearer the light emission side lens 30 as compared with the light receiving side lens 31 and the PSD 34. In the extreme case, the light receiving side lens 32 and the light emission side lens 30 may be disposed adjacently.

Reference numeral 33 represents an IRED serving as a light emitting device. Reference numeral 36 represents a subject having a contrast as shown in FIG. 1 for example.

As described above, the first embodiment has an arrangement that distance (the base line directional distance) $L_1$ in the direction from the light emission side lens 30 to the light receiving side lens 31 and distance $L_2$ from the light emission side lens 30 to the light receiving side lens 32 are not the same but the distances have a relationship expressed by $L_2<L_1$. In addition, lenses 30, 31 and 32 are colinear along a base line. The overall length of the PSD 34 and that of the PSD 35 are the same length (A) and also the diameter of the light receiving side lens 31 and that of the light receiving side lens 32 are the same.

Figure 2:
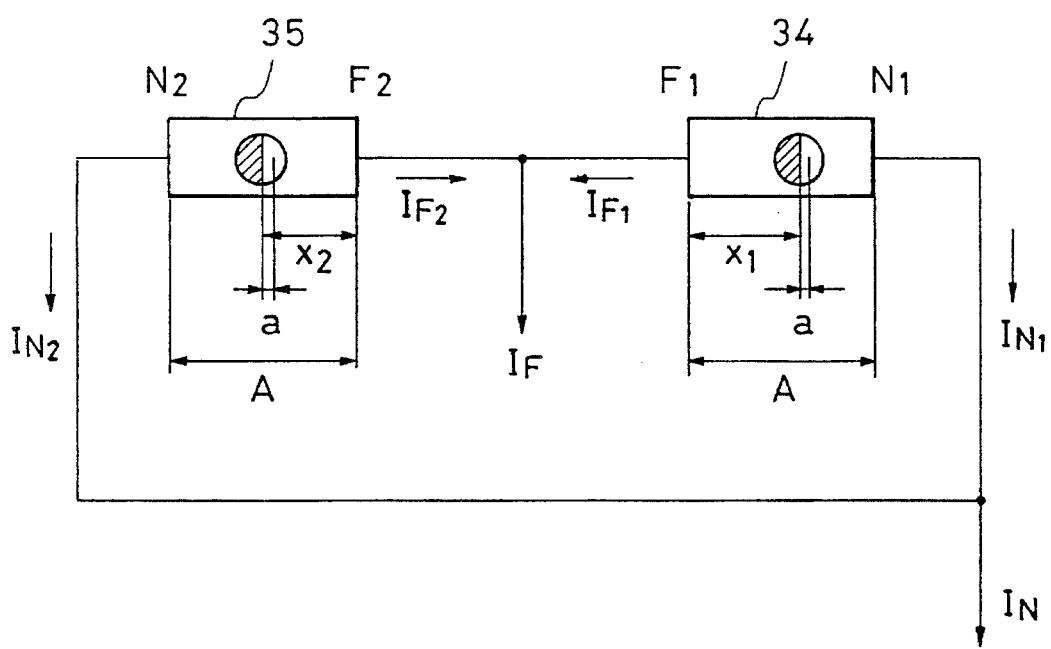
FIG. 2 illustrates a state of a received light spot image on each PSD shown in FIG. 1.

FIG. 2 shows spot images of light received from the subject 36 having a contrast and disposed on the PSD 34 and PSD 35. Referring to FIG. 21, the spot images on the PSD 34 and the PSD 35 respectively have central positions $x_1$ and $x_2$. Symbol a represents the quantity of an optical movement of the center of each of the spots of light received from the subject 36 having the contrast.

Assuming that the output electric currents from distal terminals $F_1$ and $F_2$ and proximal terminals $N_1$ and $N_2$ of the PSDs 34 and 35 are $I_{F1}$, $I_{F2}$, $I_{N1}$ and $I_{N2}$, the total electric current generated by the light spot is $I_T$ and the overall length of each of the PSDs 34 and 35 is A, the following relationships are held:

$$I_{F1}=I_T \times \{A-(x_1+a)\}/A$$

$$I_{N1}=I_T \times (X_1+a)/A$$

$$I_{F2}=I_T \times \{A-(x_2-a)\}/A$$

$$I_{N2}=I_T \times (x_2-a)/A$$

When the foregoing output terminals are connected in such a manner that the sum ($I_F$) of $I_{F1}$ and $I_{F2}$ and the sum ($I_N$) of $I_{N1}$ and $I_{N2}$ can be taken as shown in FIG. 2, each sum is as follows:

$$\begin{aligned} I_F &= I_{F1}+I_{F2} & (1) \\ &= I_T \times \{2-(x_1+x_2)/A\} \\ I_N &= I_{N1}+I_{N2} & (2) \\ &= I_T \times (x_1+x_2)/A \end{aligned}$$

As can be understood from Equations (1) and (2), the signals $I_F$ and $I_N$ do not include spot center movement a, and depend upon only the central position of the received light spot. Therefore, signals free from the influence of the position of the center of light caused from the contrast can be obtained.

The ensuing signal process, that is, the process of the output electric currents $I_F$ and $I_N$ is performed similarly to the conventional method, thus enabling distance information to be obtained. That is, since the output electric current $I_F$ or $I_N$ corresponds to the position at which light has been received, the distance corresponding to the position at which light has been received is obtained in accordance with $I_F$ or $I_N$ or $I_N/(I_N+I_F)$ or $(I_F-I_N)$ or $(I_F-I_N)/(I_N+I_F)$.

Second Embodiment

Figure 3:
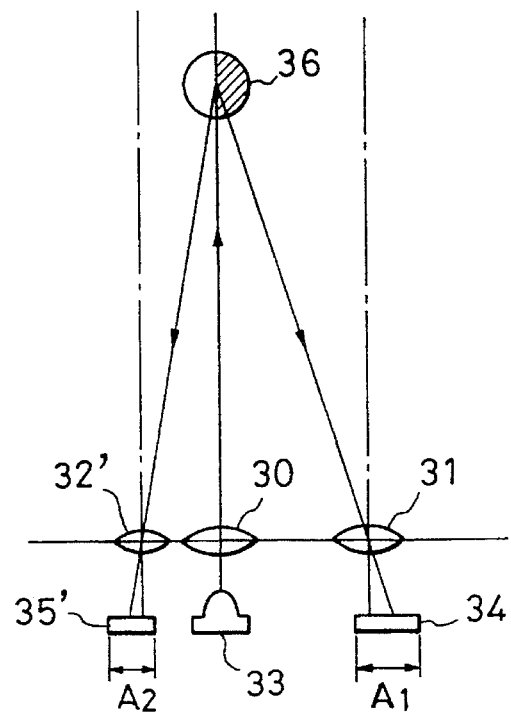
FIG. 3 is a block diagram which illustrates an essential portion of an optical system of an active-type automatic focusing apparatus according to a second embodiment of the present invention.

FIG. 3 is a block diagram which illustrates an essential portion of an optical system of an active-type automatic focusing apparatus according to a second embodiment of the present invention. The same elements as those shown in FIG. 1 are given the same reference numerals.

In this embodiment, a second light receiving side lens 32' and a second PSD 35' respectively have sizes smaller than the corresponding elements according to the first embodiment so as to reduce the size of the apparatus.

Figure 4:
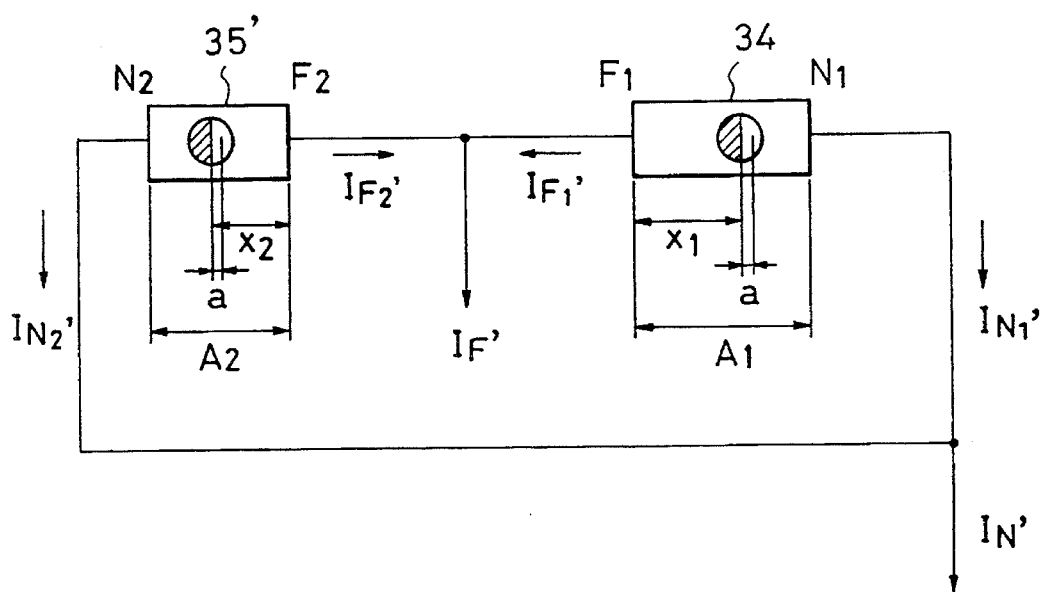
FIG. 4 illustrates a state of a received light spot image on each PSD shown in FIG. 3.
Figure 5A:
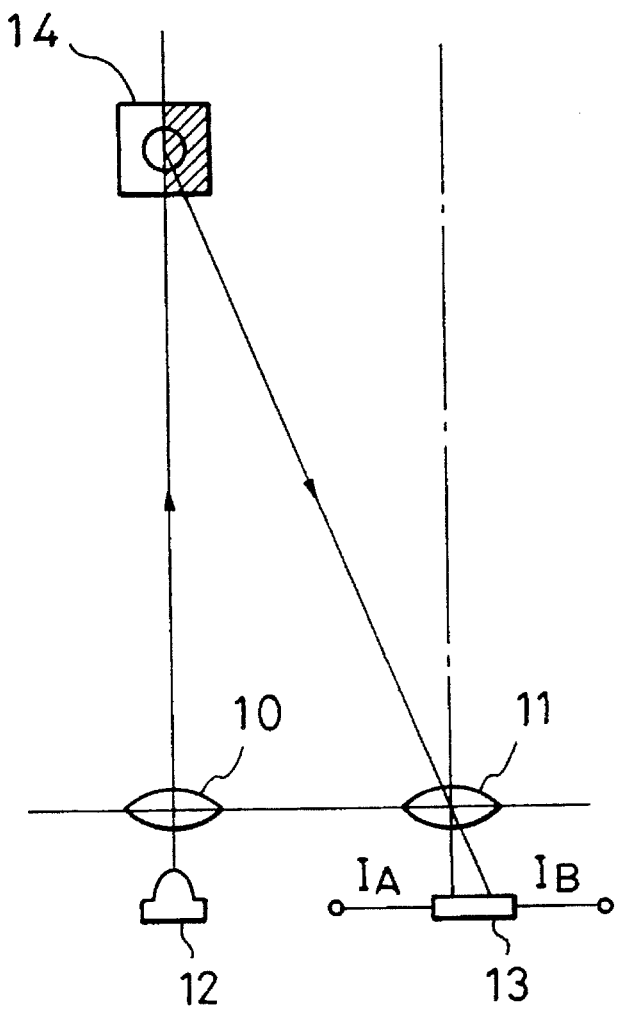
FIGS. 5(a), 5(b), and 5(c) illustrate a conventional active-type automatic focusing apparatus.
Figure 5B:
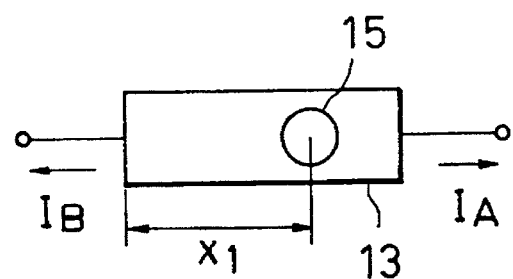
Figure 5C:
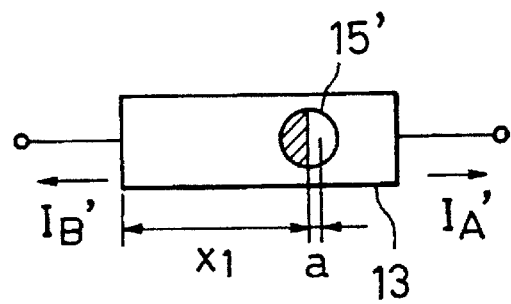
Figure 6A:
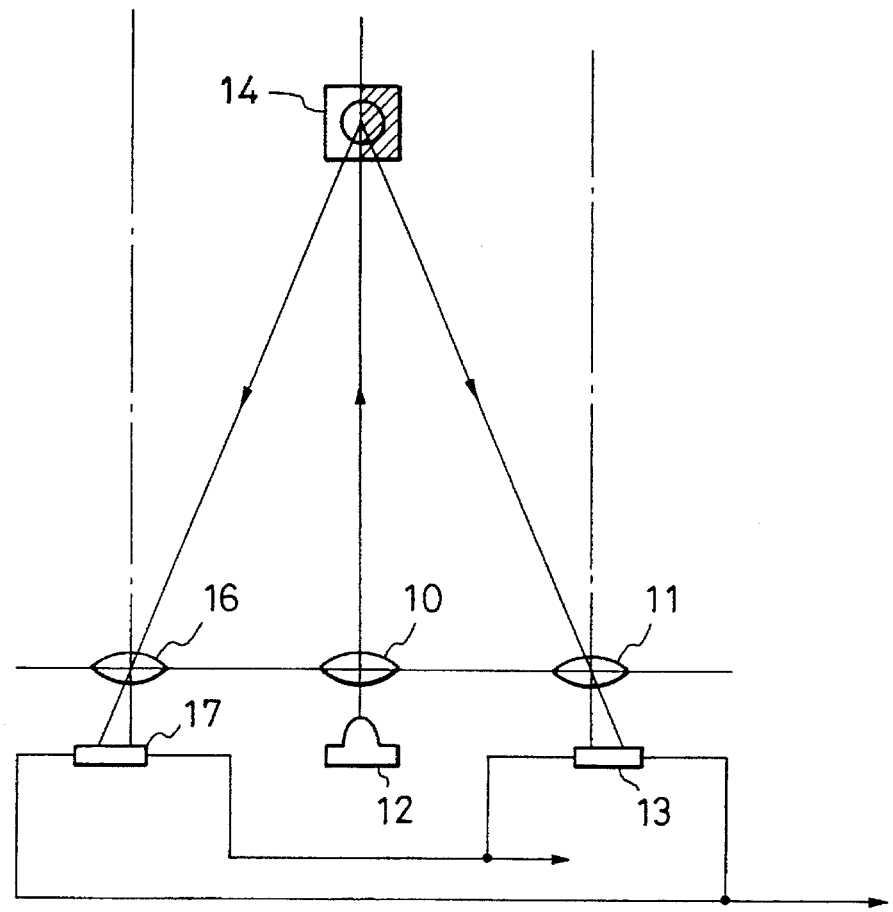
FIGS. 6(a) and 6(b) illustrate a conventional active-type automatic focusing apparatus suggested to overcome the problem experienced with the apparatus shown in FIGS. 5(a)–5(c).
Figure 6B:
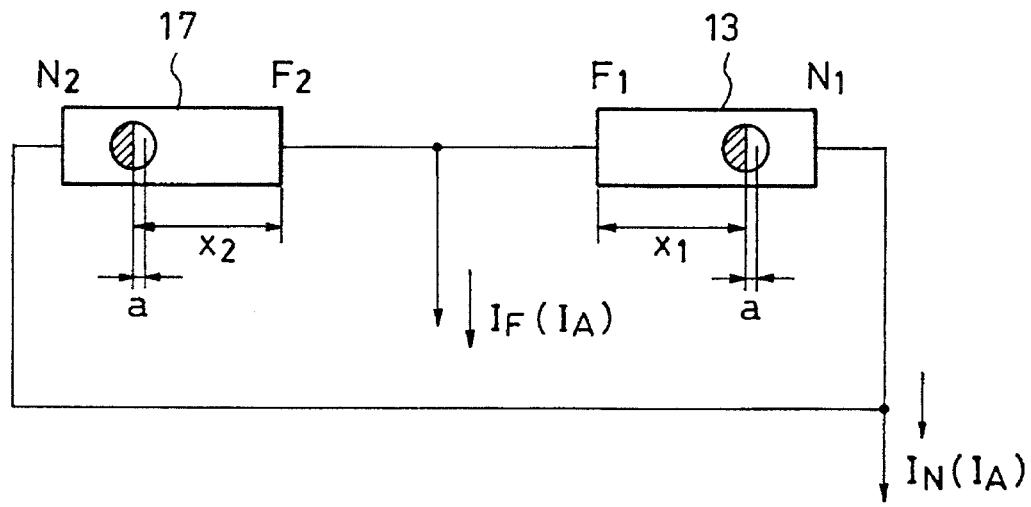

FIG. 4 shows light spot images from the subject 36 having a contrast, the light spot images being formed on the PSDs 34 and 35'. Referring to FIG. 4, $x_1$ and $x_2$ represent central positions of spot images on the PSDs 34 and 35'. Symbol a represents the quantity of optical movement of the centers of the received light spots caused from the subject contrast. Symbols $A_1$ and $A_2$ respectively represents the overall length of the PSD 34 and that of the PSD 35'.

Assuming that output electric currents from the distal terminals $F_1$ and $F_2$ and the proximal terminals and $N_2$ of the PSDs 34 and 35' are $I_{F1}'$, $I_{F2}'$, $I_{N1}'$ and $I_{N2}'$, the following relationships are held:

$$I_{F1}'=I_{T1} \times \{A_1-(x_1+a)\}/A_1$$

$$I_{N1}'=I_{T1} \times (x_1+a)/A_1$$

$$I_{F2}'=I_{T2} \times \{A_2-(x_2-a)\}/A_2$$

$$I_{N2}'=I_{T2} \times (x_2-a)/A_2$$

where $IT_{T1}$ and $I_{T2}$ represent total electric currents generated from received light spots on the PSDs 34 and 35' and having different values ($I_{T1}>I_{T2}$) because the diameter of the light receiving side lens 31 and that of the light receiving side lens 32' are different from each other.

When the foregoing output terminals are connected as shown in FIG. 4 in such a manner that the sum ($I_F'$) of $I_{F1}'$ and $I_{F2}'$ and the sum (IN') of $I_{N1}'$ and $I_{N2}'$ are taken, the sums are as follows:

$$\begin{aligned} I_F' &= I_{F1}' + I_{F2}' & (3) \\ &= I_{T1} + I_{T2} - (I_{T1}/A_1) \times x_1 - (I_{T2}/A_2) \times \\ & \quad x_2 + a\{(I_{T2}/A_2)-(I_{T1}/A_1)\} \\ I_N' &= I_{N1}' + I_{N2}' & (4) \\ &= (I_{T1}/A_1) \times x_1 + (I_{T2}/A_2) \times x_2 + \\ & \quad a\{(I_{T1}/A_1)-(I_{T2}/A_2)\} \end{aligned}$$

As can be understood from the foregoing Equations (3) and (4), an arrangement that causes the following relationship to be held $$(I_{T1}/A_1)=(I_{T2}/A_2)=k \quad (5)$$

causes the following relationship to be held:

$$I_F'=I_{T1}+I_{T2}-k(x_1+x_2)$$

$$I_N'=k(x_1+x_2)$$

Thus, the term relating to the quantity a of the optical movement of the center of light of the received light spot caused by the subject 36 having a contrast is eliminated. That is, the influence of the contrast is eliminated.

Since the total electric currents $I_{T1}$ and $I_{T2}$ generated from the received light spots on the PSDs 34 and 35' are in proportion to the area of an effective aperture of each of the light receiving side lenses 31 and 32', an arrangement that the ratio of the overall lengths $A_1$ and $A_2$ of the PSDs 34 and 35' and the areas of the openings in the light receiving side lenses 31 and 32' satisfy Equation (5) enables the influence of the contrast of the subject to be eliminated.

Although the second embodiment has the arrangement that the difference in the influences of the contrast of the subject on the two PSDs 34 and 35' occurring due to the differences in the apertures between the light receiving side lenses 31 and 32' and the light emission side lens 30 is corrected by designing the structure to satisfy the foregoing Equation (5), the correction may be performed by arranging the circuit in such a manner that the outputs from the PSDs 34 and 35' are processed by individual circuit systems.

Although the foregoing embodiments have the arrangement that the present invention is adapted to one-point range finding, a multi-point range finding operation can, of course, be performed if a plurality of PSDs are disposed on the focal plane of the light receiving side lenses 31 and 32 and a plurality of IREDs are disposed on the focal plane of the light emission side lens 30. Although the PSDs are employed as the light receiving devices, the light receiving devices may comprise bisectional sensors such as SPC sets each consisting of two SPCs. In this case, the position, at which light is received, is obtained in accordance with the difference or the ratio of the outputs from the SPCs forming one set. Although the distance from the subject is obtained, a focusing state may be obtained.

Since each of the foregoing embodiments has the arrangement that one light receiving side lens and one PSD are disposed on each of the two sides of the light emission side lens and one light receiving side lens and one PSD are disposed adjacent to the light emission side lens, there can be provided an active-type automatic focusing apparatus that is free from an error in finding the range even if the subject has a contrast or even if only a portion of a subject is irradiated with light, while reducing the overall size thereof.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An apparatus for determining at least one of a distance to an object and a focus state of the object, said apparatus comprising:

light emitting means for emitting light, said light being reflected by said object;

first and second light receiving optical systems, each positioned to receive light emitted from the light emitting means and reflected by the object; and first and second light receiving means, each positioned to receive light from said first and second light receiving optical systems, respectively, wherein said light emitting means is disposed between said first and second light receiving optical systems, wherein a first distance between said first light receiving optical system and said light emitting means and a second distance between said second light receiving optical system and said light emitting means are different from each other, and wherein a ratio of an output to a length of said first light receiving means and a ratio of an output to a length of said second light receiving means are identical to each other, and wherein at least one of said distance to the object and a focus state of the object is determined in accordance with an output representing light received by said first and second light receiving means.

2. An apparatus according to claim 1, wherein said a line between first light receiving optical system and said light emitting means and a line between said second light receiving optical system and said light emitting means together define a base line.

3. An apparatus according to claim 2, wherein said first and second light receiving means generate outputs corresponding to positions at which light emitted by said light emitting means and reflected by the object is received by said first and second light receiving means.

4. An apparatus according to claim 1, further comprising:

a calculating circuit for obtaining at least one of the distance from the object and the focus state thereof in accordance with an output from each of said first and second light receiving means, wherein said calculating circuit obtains a value corresponding to a sum of outputs from said first and second light receiving means.

5. An apparatus for determining at least one of a distance to an object and a focus state of the object, said apparatus comprising:

light emitting means for emitting light through a light emitting optical system, said light being reflected by said object;

first and second light receiving means, each positioned to receive light emitted from the light emitting means and reflected by the object, wherein a length of either of said first and second light receiving means is different from a length of the other of said first and second light receiving means; and a calculating circuit for obtaining at least one of the distance from the object and the focus state in accordance with an output from said first light receiving means and an output from said second light receiving means, a ratio of the output to the length of said first light receiving means being substantially the same as a ratio of the output to the length of said second light receiving means.

6. An apparatus according to claim 5, wherein each of said first and second light receiving means comprises a position sensing device each having first and second outputs, a ratio of the sum of the first and second outputs and the length of said position sensing device comprising said first light receiving means being substantially the same as a ratio of the sum of the first and second outputs and the length of said position sensing device comprising said second light receiving means.

7. An apparatus according to claim 5, wherein each of said first and second light receiving means comprises a bisectioned sensor, a ratio of the sum of the first and second outputs and the length of said bisectioned sensor comprising said first light receiving means being substantially the same as a ratio of the sum of the first and second outputs and the length of said bisectioned sensor comprising said second light receiving means.

8. Apparatus according to claim 5, wherein said first and second light receiving means receive light from said first and second light receiving optical systems, respectively, and wherein a distance between said first light receiving optical system and said light emitting means and a distance between said second light receiving optical system and said light emitting means are different from each other.

9. An apparatus for determining at least one of a distance to an object and a focus state of the object, said apparatus comprising:

light emitting means for emitting light through a light emitting optical system, said light being reflected by said object;

first and second light receiving optical systems, each positioned to receive light emitted from the light emitting means and reflected by the object;

first and second light receiving means each positioned to receive light from said first and second light receiving optical systems, respectively;

wherein diameters of said first and second light receiving optical systems are different from each other, a length of said first light receiving means and a length of said second light receiving means are different from each other, and a ratio of the diameter of said first light receiving optical system to the length of said first light receiving means and a ratio of the diameter of said second light receiving optical system to the length of said second light receiving means are identical to each other; and a calculating circuit for obtaining at least one of said distance to the object and the focus state of the object in accordance with an output from said first light receiving means and an output from said second light receiving means.

* * * * *

UNITED STATES PATENT AND TRADEMARK OFFICE
CERTIFICATE OF CORRECTION

PATENT NO. : 5,613,167
DATED : March 18, 1997
INVENTOR(S) : RYOUICHI SUZUKI

It is certified that error appears in the above-identified patent and that said Letters Patent is hereby corrected as shown below:

ON THE COVER PAGE

AT ITEM [56] "References Cited"

U.S. PATENT DOCUMENTS, "Hasoe et al." should read --Hosoe et al.--.

IN THE DISCLOSURE

COLUMN 4

Line 5, "mode" should read --more--.

COLUMN 7

Line 40, "and" (second occurrence) should be deleted.
Line 58, "said" should be deleted.
Line 59, "first" should read --said first--.

Signed and Sealed this

Twenty-third Day of September, 1997

Attest:

BRUCE LEHMAN

*Attesting Officer*    Commissioner of Patents and Trademarks